United States Patent
Sugiura

[19]
[11] Patent Number: 5,939,175
[45] Date of Patent: Aug. 17, 1999

[54] METHOD OF FINISHING HEAT-REINFORCED PLATE GLASS AND EDGE REGIONS THEREOF

[75] Inventor: Kiminari Sugiura, Osaka, Japan

[73] Assignee: Nippon Sheet Glass Co., Ltd., Osaka, Japan

[21] Appl. No.: 08/981,129

[22] PCT Filed: Apr. 7, 1997

[86] PCT No.: PCT/JP97/01188

§ 371 Date: Nov. 24, 1997

§ 102(e) Date: Nov. 24, 1997

[87] PCT Pub. No.: WO97/37947

PCT Pub. Date: Oct. 16, 1997

[30] Foreign Application Priority Data

Apr. 11, 1996 [JP] Japan ................................. 8-89537
Apr. 11, 1996 [JP] Japan ................................. 8-89566
Apr. 15, 1996 [JP] Japan ................................. 8-92252

[51] Int. Cl.⁶ .................................................. B32B 23/02
[52] U.S. Cl. ........................... 428/192; 428/34; 428/137;
428/210; 428/410; 428/417; 428/426; 428/432;
428/437; 156/153; 65/104; 65/106; 65/111;
65/114; 65/115
[58] Field of Search .................................. 428/137, 426,
428/13, 34, 192, 210, 410, 415, 417, 432,
437; 65/114, 104, 115, 61, 111, 102, 106,
30.14; 156/654.1, 153; 296/84 R

[56] References Cited

U.S. PATENT DOCUMENTS 3,843,472  10/1974  Toussaint et al. .................. 161/199
4,182,619  1/1980   Greenhalgh ......................... 65/114

FOREIGN PATENT DOCUMENTS 07231055  8/1995  Japan.
1358061   6/1974  United Kingdom.

OTHER PUBLICATIONS

Patent Abstracts of Japan vol. 096, No. 009, Sep. 30 1996 & JP 08118220 A (Nippon Sheet Glass Co.Ltd), May 14 1996.

Patent Abstracts of Japan vol. 097, No. 007, Jul. 31 1997 & JP 09 071429 A (Nippon Sheet Glass Co. Ltd.), Mar. 18 1997.

Primary Examiner—Deborah Jones
Assistant Examiner—Abraham Bahta
Attorney, Agent, or Firm—Fulbright & Jaworski, LLP.

[57] ABSTRACT

Diclosed is a plate glass wherein surfaces (3a) of plate glass (3) are formed flat and finished with a maximum surface ruggedness not exceeding 0.05 mm, and boundaries (3c) between end surfaces (3a) and front and back surfaces (3b) of the plate glass (3) are finished with a maximum surface ruggedness not exceeding 0.007 mm. Thus, though the plate glass is treated with heat reinforcement by the method simpler and more convenient than the prior art, the plate glass maintains performance as fire glass. It is now possible to provide quality improvement as plate glass, a reduction in running cost of heat reinforcing treatment equipment, and a reduction in working stress due to the weight of the plate glass itself in time of fitting the plate glass.

22 Claims, 3 Drawing Sheets

METHOD OF FINISHING HEAT-REINFORCED PLATE GLASS AND EDGE REGIONS THEREOF

FIELD OF THE INVENTION

This invention relates to a method of finishing heat-reinforced plate glass and edge regions thereof which are formed by a manufacturing method using or not using suspender metals, and which may be used for fire doors and fire windows, and more particularly to a method of finishing heat-reinforced plate glass and edge regions thereof having received heat reinforcing treatment over entire surfaces thereof.

BACKGROUND OF THE INVENTION

Where plate glass is used for fire doors and fire windows, the glass must have high edge strength in order to prevent heat cracking of the plate glass. (A thermal expansion occurring in a central region of glass when heated applies a tensile stress to edge regions of the plate glass supported by a window frame or the like, and cracking is caused by the tensile stress exceeding the edge strength of the plate glass).

Known plate glass for fire prevention includes wire glass, and laminated glass having an intermediate layer formed of hydrated alkali silicate. The former may have transparency impairment, with the wiring mounted inside obstructing view. The latter may have transparency impairment, with the intermediate layer foaming up with a heat change and becoming opaque. Soda lime glass having received heat reinforcing treatment may be cited as being free from such a problem.

Heat reinforcing treatment is a method executed by heating plate glass in a temperature range (about 760° C.) far exceeding the softening point of glass (720–730° C.), and blowing cooling air under a very high back pressure of 950 mmAq to a continuous air cooled portion. However, with such heat reinforcing treatment of plate glass, although a predetermined edge strength may be given, the air blown under high pressure to the plate glass heated in the high temperature range exceeding the glass softening point as noted above could result in loss of flatness and create warping to bring about inconveniences in image reflection.

Conventionally, heat-reinforced plate glass of this type includes glass plate having curved edges protruding outwardly in directions along the plane of the plate glass, progressively toward the middle position in the direction of thickness of the plate glass.

According to the conventional heat-reinforced plate glass noted above, in order to be usable for fire doors or fire windows, it is necessary to carry out the above heat reinforcing treatment by heating the plate glass in the temperature range (about 760° C.) far exceeding the softening point of glass (720–730° C.), and blowing cooling air under the very high back pressure of 950 mmAq to a continuous air cooled portion. This heat reinforcing treatment results in the inconvenience noted above (i.e. a loss of flatness of glass surfaces and warping to impair image reflection).

To eliminate this inconvenience (surface non-flatness and warping), a heat reinforcing treatment (hereinafter called simply low-temperature heat reinforcing treatment) may be carried out by lowering the heating temperature and the back pressure of air blown from the values in the conventional heat reinforcing treatment. Then, sufficient edge strength cannot be secured, and thermal distortional stress concentrates on edge regions, particularly polished corners, of the plate glass when exposed to the heat of fire or in fire prevention testing. Particularly where the plate glass has curved end surfaces protruding outwardly along the direction of the plane, a new problem arises that the plate glass tends to break in time of fitting the plate glass, under a working stress due to the weight of the plate glass itself applied to forward ends (portions of the curved shapes protruding most outwardly) of the end surfaces. Generally, plate glass is mounted on weight-receiving rubber elements (setting blocks) laid in two ¼ positions from the opposite ends of the lower edge. However, incombustible hard blocks are often used as the setting blocks used for fire prevention purposes. In that case, there arises a problem that a working stress by gravity is applied to the tip end of the glass.

Therefore, the object of this invention is to provide a method of finishing heat-reinforced plate glass and edge regions thereof which solves the above-noted problem of the prior art, and which can secure a predetermined edge strength of plate glass even if the degree of heat reinforcing treatment is lowered.

SUMMARY OF THE INVENTION

Heat-reinforced glass of this invention is characterized in that end surfaces of plate glass having received heat reinforcing treatment over entire surfaces thereof are formed flat and finished with a maximum surface ruggedness not exceeding 0.05 mm, and boundaries between the end surfaces and front and back surfaces of the plate glass are finished with a maximum surface ruggedness not exceeding 0.007 mm.

Generally, internal stress occurring in plate glass tends to concentrate on ridges. With the above construction of this invention, the heat-reinforced glass has stress not easily concentrating on the edges, and tips of the edges are relatively free from working stress due to the weight of the plate glass itself occurring in time of fitting the plate glass.

Thus, according to the heat-reinforced plate glass of this invention, though the plate glass is treated with heat reinforcement by a method simpler and more convenient than the prior art, the plate glass maintains performance as fire glass. It is now possible to provide quality improvement as plate glass, a reduction in running cost of heat reinforcing treatment equipment, and a reduction in working stress due to the weight of the plate glass itself in time of fitting the plate glass.

Preferably, the end surfaces have received grinding treatment in longitudinal directions thereof.

It has been found through experiment that, if the end surfaces are ground along transverse directions thereof, cracks tend to occur from relatively small undulations. This is not the case with grinding done in the longitudinal directions.

A heat-reinforced plate glass edge finishing method of this invention is characterized in that a grinding step is executed to form end surfaces of the plate glass flat with a maximum surface ruggedness not exceeding 0.05 mm, and then a finishing step is executed to finish boundaries between the end surfaces and front and back surfaces of the plate glass with a maximum surface ruggedness not exceeding 0.007 mm.

With this method, the heat-reinforced glass manufactured has stress not easily concentrating on the edges, and tips of the edges are relatively free from working stress due to the weight of the plate glass itself occurring in time of fitting the plate glass.

That is, the end surfaces of plate glass are finished in smooth state with a maximum surface ruggedness not exceeding 0.05 mm, preferably not exceeding 0.04 mm, and with no ridges formed on the end surfaces. It is thus possible to avoid stress concentration on the end surfaces. Further, the boundaries between the end surfaces and front and back surfaces of the plate glass are finished in a still smoother state with a maximum surface ruggedness not exceeding 0.007 mm. Thus, the plate glass as a whole includes no ridges vulnerable to stress concentration. It is now possible to avoid stress concentration on edges of the plate glass and to improve edge strength structurally. The increase in edge strength is approximately 4 kgf/mm$^2$.

Where the maximum surface ruggedness exceeds 0.05 mm, even if flat and relatively free from stress concentration, stress does tend to concentrate on troughs and ridges of the ruggedness. At the boundaries between the end surfaces and front and back surfaces of the plate glass, since these are transitions between surfaces, stress tends to concentrate on troughs and ridges of the ruggedness if the maximum ruggedness exceeds 0.007 mm.

With the increase in edge strength noted above, a predetermined edge strength may be secured after the heat reinforcing treatment based on heating in a temperature range lower than the conventional range, and a lower blowing pressure than in the prior art. It is possible to avoid lack of smoothness on glass surfaces and warping to cause inconveniences in image reflection.

Thus, according to the heat-reinforced plate glass edge finishing method of this invention, it is easy to prevent internal stress from concentrating on the edges of plate glass, thereby realizing an increase in edge strength of the plate glass compared with the prior art. Consequently, though the plate glass is treated with heat reinforcement by a method simpler and more convenient than the prior art, the plate glass maintains performance as fire glass. It is now possible to provide quality improvement as plate glass, and a reduction in running cost of heat reinforcing treatment equipment.

Preferably, the heat reinforcing treatment provides a surface compression stress of 17 to 25 kgf/mm$^2$.

When a surface compression stress of 25 kgf/mm$^2$ is attempted, an excessive distortion occurs in glass plate during rapid cooling in reinforced glass manufacture, which tends to break the glass.

For using ordinary heat-reinforced plate glass as grade A and grade B fire doors in fire protection tests based on Japanese Ministry of Construction Notice No. 1125, it is necessary to secure an edge strength of plate glass of at least 21 kgf/mm$^2$ (where the plate glass is supported as shown in FIG. 2 in which an edge region of the plate glass have a depth (which is called opposed range) d engaged with a sash is in the order of 10 mm, and the edge region is mounted in a holding metal 9 of excellent heat conduction), as otherwise the glass could break. With the heat reinforcing treatment providing a surface compression stress of 17 to 25 kgf/mm$^2$ according to this invention, an edge strength of 21 to 29 kgf/mm$^2$ in substance is secured in combination with the increase in edge strength of 4 kgf/mm$^2$ resulting from finishing of the edges of plate glass noted hereinbefore. Thus, the plate glass may be used, with no problem, as grade A and grade B fire doors (i.e. fire doors maintain a fire-preventive performance for 30 minutes and 60 minutes against heating based on the standard fire temperature curve provided by ISO 834). When the surface compression stress by the heat reinforcing treatment exceeds 25 kgf/mm$^2$, the surface compression stress applied to the plate glass becomes non-uniform which causes inconveniences.

Where the plate glass is supported with the opposed range d adjusted to about 15 mm, a slightly increased temperature difference occurs between the edge and central region of the plate glass. This requires a surface compression stress of at least 18 kgf/mm$^2$.

Where the opposed range d is about 15 mm and support is provided without using the holding metal (see FIG. 3), a surface compression stress of at least 22 kgf/mm$^2$ is required.

That is, the plate glass in either of the above supported states may be used as grade A and grade B fire doors with no problem.

Where the finishing step is based on buff grinding, the ruggedness on the ground surfaces may be polished in the order of several micrometers. Thus, the boundaries are free from large grinding grooves resulting from the grinding, thereby to check stress concentration on the grinding grooves in the plate glass and to increase edge strength of the plate glass.

Where the finishing step is based on heat melting, the finished surfaces may be finished to be comparable to the plate glass surfaces, to increase edge strength of the plate glass.

Where the finishing step is based on chemical dissolution, the finishing step itself may be executed by a simple operating procedure, to improve efficiency of an operation to finish the edges of plate glass.

Preferably, a dark colored layer is formed in edge regions on at least one of the surfaces.

That is, in order to diminish the temperature difference occurring between the edge and central region of the plate glass in the event of a fire, for example, it is preferable to a dark colored layer is formed in edge regions on at least one of the surfaces. This improves heat absorption of the plate glass. As a result, thermal stress occurring in the edge regions of the plate glass is eased by a maximum of about 3 kgf/mm$^2$.

The dark colored layer may be formed by a printing method using black ceramic paste, for example. It is desirable to form the colored layer along four sides of the plate glass with a width in the order of 30 to 50 mm from the edges. Further, it is preferable that the colored layer becomes thicker toward the edges.

Where the plate glass is double glazing, the performance as fire glass may advantageously be improved still further.

DETAILED DESCRIPTION OF PREFERRED EMBODIMENTS

Embodiments of this invention will be described hereinafter with reference to the drawings.

Figure 2:
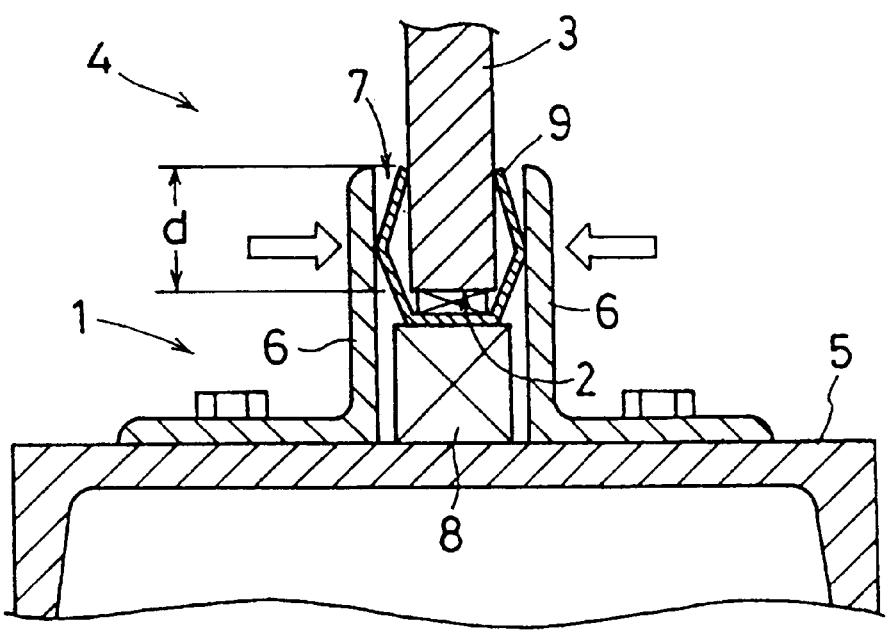
FIG. 2 is a sectional view of a principal portion of a fire door in a first embodiment.

FIG. 2 shows a fire door 4 having, fitted in a sash 1, an edge 2 of plate glass 3 which is heat-reinforced plate glass in one embodiment of this invention.

The sash 1 includes an annular main sash body 5 forming a door frame part. The main sash body 5 has a holder 6 detachably attached to an inner peripheral frame thereof for attaching the plate glass 3 to the main sash body 5.

The main sash body 5 and holder 6 are both formed of metal, by taking into account that the plate glass 3 may be supported in place even in the event of a fire. The holder 6 is formed of a pair of angle elements attached to the main sash body 5 to define a space 7 therebetween for holding the edge 2 of plate glass 3.

The space 7 accommodates setting blocks (which are disposed only in the space 7 in at the lower side of the sash 1) (8) formed of chloroprene rubber and having a function to protect the edge of plate glass 3, and a holding metal 9 for sandwiching therebetween the edge 2 of plate glass 3 and fixing it to the holder 6.

The holding metal 9 is formed of a thin metallic plate for elastically holding and fixing the edge 2 when the plate glass 3 placed in the space 7. Specifically, it has a length extending substantially over an entire length of the edge 2 of plate glass 3. As shown in the drawings, it has a sectional shape of angled "U" (shape of a hexagon with the upper side removed) as seen in a direction of length of the edge 2. The opposite ends of the "U" are in line contact with the front and back surfaces of plate glass 3, respectively. It has an outside dimension larger than the width of the space 7. When fitted in the space 7, holding the edge 2 of plate glass 3, it receives a suppressing force in the holding directions from the holder 6 to rigidly sandwich the plate glass 3. Thus, the glass edge is prevented from coming off by a thermal deformation of plate glass 3 in time of a fire.

The holding metal 9, which is formed of metal (e.g. iron, stainless steel, copper, aluminum or an alloy thereof), is readily adaptable to ambient temperature. In the event of a fire, for example, heat will easily be conducted to the edge of plate glass 3 supported, to inhibit a temperature difference between the edge and central region, thereby to diminish the chance of breakage. The strength against breakage, in terms of stress generated in the edge, is a stress of 22 $kgf/mm^2$ generated in a normal holding state with a range d in the order of 15 mm of the plate glass 3 opposed to the holder 6 as shown in the drawings. Where the opposed range d is shallow in the order of 10 mm, a small temperature difference occurs between central region and edge of the plate glass 3. Consequently, the stress generated diminishes by about 1 $kgf/mm^2$ to become about 21 $kgf/mm^2$.

The plate glass 3 will be described next.

The plate glass 3 is formed by putting soda lime plate glass to an edge finishing process described later, and then to a heat reinforcing treatment based on a manufacturing method not using suspender metals.

The plate glass 3 is put to a grinding process for smoothing the end surface 3a to have a maximum surface ruggedness of 0.05 mm or less, preferably 0.04 mm or less, and then to a finishing process for further smoothing boundaries 3c between the end surface 3a and front and back planar surfaces 3b of plate glass 3 than in the above grinding process, i.e. to have a maximum surface ruggedness of 0.007 mm or less.

Figure 1:
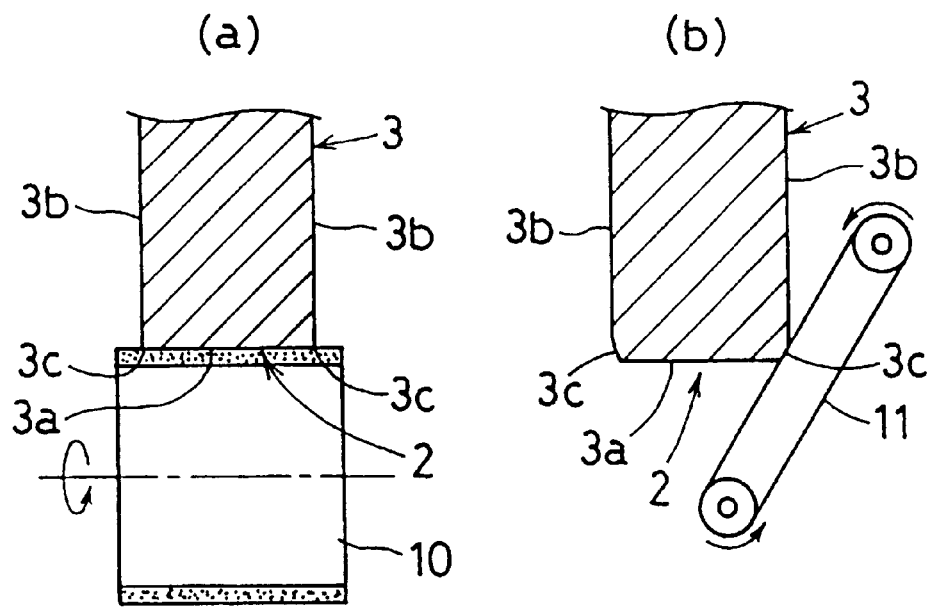
FIGS. 1 (a) and (b) are explanatory views showing a method of finishing edge regions of heat-reinforced plate glass.

Specifically, as shown in FIG. 1 (a), the grinding process is carried out by a grinding method based on planar rotation cylinder wheel type grinding using an outer peripheral surface of a cylinder wheel 10 rotatable about an axis. The cylinder wheel 10 has an outer peripheral surface formed so that an outside diameter is the same in the axial direction, in an intermediate position and opposite side positions, so that the end surface 3a of plate glass 3 is ground flat. The outer peripheral surface of cylinder wheel 10 is formed to be a grinding section finer than #200, preferably finer than #220.

The end surface 3a ground in this grinding process is flat and finished to have a surface ruggedness in the order of 0.05 mm, preferably in the order of 0.03 mm. Since this is a very fine ruggedness, it is easy to avoid a concentration of internal stress of the plate glass 3. Further, working stress due to the weight of the glass is hardly applied when fitting the glass.

Further, a grinding direction in the grinding process is set to the longitudinal direction of the end surface 3a of plate glass 3. Thus, the grinding forms streaks (scars) in the longitudinal direction of the end surface 3a. This helps to avoid a concentration of thermal breaking force and the like acting along the plate surfaces of plate glass 3.

As shown in FIG. 1(b), the finishing process is carried out by a grinding method based on buff grinding using an outer peripheral surface of a grinding belt 11 rotatable on two rotary shafts. This buff grinding is also called the finest quality finish using the belt 11 formed of sheepskin. The grinding is done while applying an aqueous solution of cerium oxide (grinding powder of very fine grain size) to the part to be ground. As a result, a surface roughness as fine as 3 to 7 $\mu$m is obtained (which is almost equal to a surface roughness of the front and back surfaces of the plate glass), gloss may be brought out, a concentration of internal stress on the boundaries 3c may be inhibited. In terms of strength, it is about 4 $kgf/mm^2$.

In the grinding process and finishing process, it is possible to avoid a concentration of internal stress on the edge 2 of plate glass 3 and, in particular, it is easy to avoid a concentration of internal stress acting along the plate surfaces of plate glass 3. As a result, it does not easily break under the heat of a fire. It has been confirmed stress of about 4 $kgf/mm^2$ is eased in terms of stress applied in the heat reinforcing treatment.

For using plate glass as grade A and grade B fire doors in fire protection tests based on Japanese Ministry of Construction Notice No. 1125, it is necessary to secure an edge strength of plate glass of at least 26 $kgf/mm^2$ (where the opposed range d is in the order of 15 mm). The plate glass 3 in this embodiment can secure an edge strength of 4 $kgf/mm^2$ with use of the holding metal 9, and of about 4 $kgf/mm^2$ with finishing of the end surface 2. Thus, a reinforcement of at least 18 $kgf/mm^2$ may be obtained through the heat reinforcing treatment. Where the opposed range d is shallow in the order of 10 mm, the temperature difference between central region and edge of the plate glass 3 is diminished to a minor extent, and therefore a reinforcement of at least 17 $kgf/mm^2$ may be obtained through the heat reinforcing treatment.

Thus, the heat reinforcing treatment of this plate glass 3 does not require the conventional specifications of 760° C. heating temperature of plate glass 3 and 950 mmAq back pressure for applying cooling air from nozzles. The necessary edge strength may be secured, for example, by adopting a heating temperature below the glass softening point (720–730° C.) and a cooling air applying back pressure of 500 mmAq. Thus, yield may be improved by preventing a deterioration in quality of plate glass due to the heat reinforcing treatment (lack of smoothness on glass surfaces and warping). It is also possible to achieve a reduction in running cost of equipment for the heat reinforcing treatment.

The edge strength (surface compression stress) of plate glass 3 was measured by a total reflection stress measuring method. The total reflection stress measuring method was executed by placing, on a plate glass surface to be measured, a prism having a slightly larger refraction index than the plate glass. A circular polarized light flux focusing at a point of measurement is caused to enter at an angle approximately corresponding to a total reflection critical angle. A deviation between total reflection borderlines of light and shade appearing in the field of view of a reflected light observation telescope was measured on a guage calibrated based on known stress.

Figure 3:
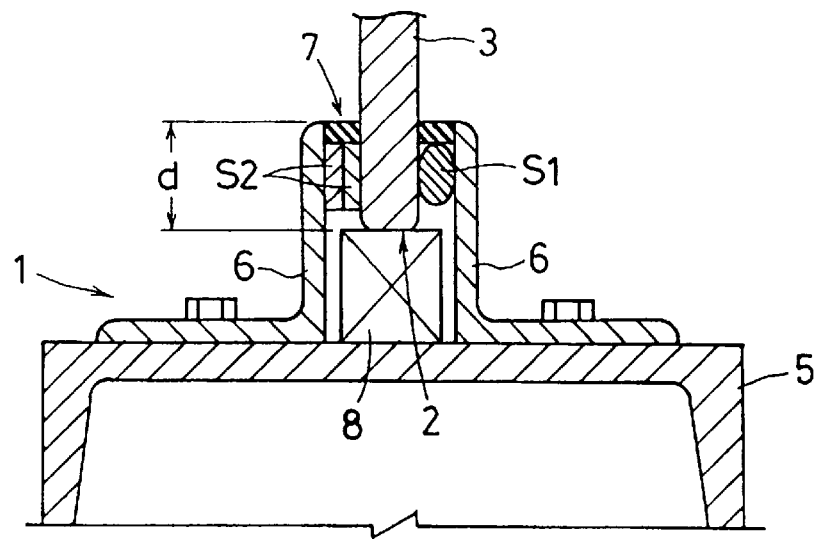
FIG. 3 is a sectional view of a principal portion of a fire door in a second embodiment.

FIG. 3 shows a support structure for supporting plate glass 3 without using the holding metal 9, in which a ceramics rope (S1) and ceramics paper (S2) are packed into the space 7 between plate glass 3 and holder 6. In the normal holding state with the opposed range d in the order of 15 mm, an edge strength of 4 kgf/mm$^2$ is secured finishing of the end surface 2 of plate glass 3. Thus, a reinforcement of at least 22 kgf/mm$^2$ may be obtained through the heat reinforcing treatment. Where the opposed range d is shallow in the order of 10 mm, the temperature difference between central region and edge of the plate glass 3 is diminished to a minor extent, and therefore a reinforcement of at least 20 kgf/mm$^2$ may be obtained through the heat reinforcing treatment.

Other embodiments will be described hereinafter.

Figure 7:
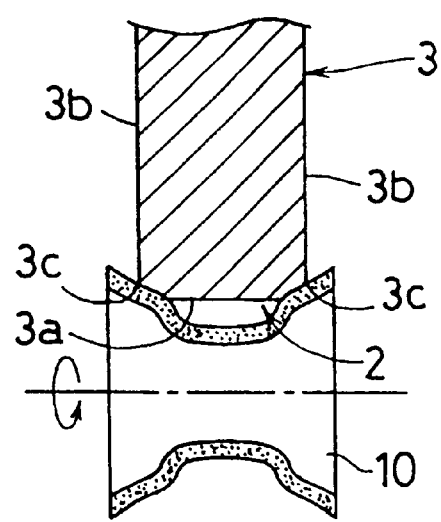
FIG. 7 is an explanatory view showing a method of finishing an end surface of heat-reinforced plate glass in a further embodiment.

The grinding process is not limited to the grinding method based on planar rotation cylinder wheel type grinding described in the foregoing embodiment. For example, it may be used in combination a grinding method using a cup wheel (with grinding diamond or whetstone mounted on a wheel surface) (see FIG. 7), or a grinding method based on buff grinding, or a grinding method combined therewith may be used. The finishing process is not limited to the buff grinding described in the foregoing embodiment. For example, the edge 2 of plate glass 3 may be heated and melted partly, or chemical dissolution may be used. In short, it will serve the purpose if the end surface 3a is formed flat with a maximum surface ruggedness of 0.05 mm or less, preferably 0.04 mm or less, and the boundaries 3c finished to have a maximum surface ruggedness of 0.007 mm or less.

Figure 4:
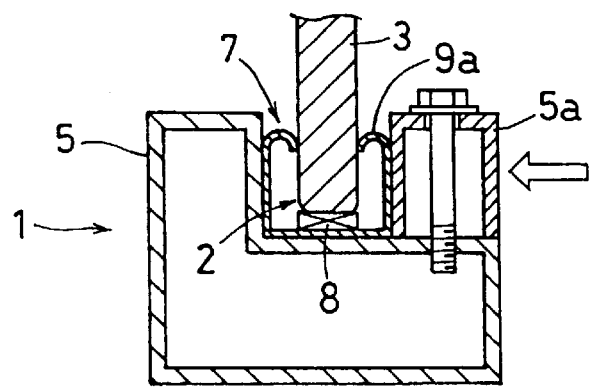
FIG. 4 is a sectional view showing a plate glass mounting situation in an another embodiment.
Figure 5:
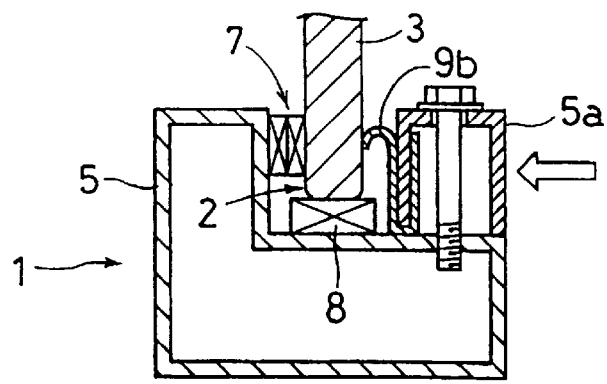
FIG. 5 is a sectional view showing a plate glass mounting situation in a further embodiment.

The attachment of plate glass 3 to the main sash body 5 not limited to the foregoing embodiment. As shown in FIG. 4, for example, it is possible to use an elastic holding metal (9a) contacting the main sash body 5 for fixing purposes. Then, radiant heat to the main sash body 5 can be efficiently conducted from the holding metal (9a) to the edge of plate glass 3. This decreases the temperature difference between central region and edge of the plate glass 3, thereby to diminish the chance of breakage. In another embodiment of attachment, as shown in FIG. 5, a sandwiching fixation may be obtained by an elastic holding metal (9b) fitting with a pressing edge (5a) of main sash body 5, and an incombustible plate (e.g. calcium silicate plate).

Figure 6:
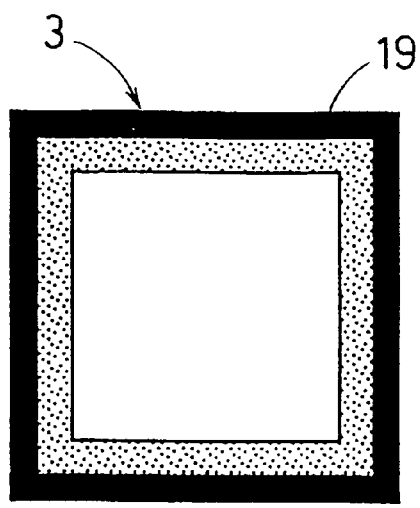
FIG. 6 is an explanatory view showing heat-reinforced plate glass having a colored layer.

As shown in FIG. 6, a dark colored layer 19 may be formed on edge regions of plate glass 3 with the end surfaces 3a having undergone grinding treatment and heat reinforcing treatment. Specifically, it is formed by screen printing. A plate is first fixed on the plate glass 3, and a squeezee not shown is slid under pressure over the plate to discharge printing ink from an opening, whereby the printing ink to be printed is placed on the edge regions of plate glass 3. After drying the plate glass 3, the plate glass 3 is once heated to 200–250° C. to print the printing ink. The printing of the printing ink may be carried out simultaneously with the heat reinforcing treatment of plate glass 3.

The dark colored layer 19 is not limited to the foregoing embodiment where it is formed on one surface of plate glass 3, but may be formed on both surfaces. The method of forming the colored layer 19 is not limited to the screen printing described in the foregoing embodiment. For example, positions of the plate glass to be printed may be masked in advance, and then the layer may be formed by a spray printing method. A pigment used as the colored layer 19 is not limited to an inorganic material described in the foregoing embodiment. An organic material may be contained in a maximum ratio within a range of 50% or less.

The plate glass 3 is not limited to the foregoing embodiment in which the heat reinforcing treatment is applied by the manufacturing method using suspender metals. For example, a horizontal reinforcing method may be employed to carry out heat reinforcing treatment while transporting plate glass on horizontal transport rolls.

The plate glass 3 is not limited to the single piece of plate glass described in the foregoing embodiment. It can be double glazing having two or more pieces plate glass. Where at least one piece of plate glass has received heat reinforcing treatment, the other piece(s) of plate glass may be wire glass, for example.

The setting blocks are not limited to chloroprene rubber, but may be formed of fluorine rubber, vinyl chloride elastomer or vinylidene chloride elastomer.

I claim:

1. Heat-reinforced plate glass having received heat reinforcing treatment over entire surfaces thereof,
   wherein the end surfaces of said plate glass are formed flat and finished with a maximum surface ruggedness not exceeding 0.05 mm, and boundaries between said end surfaces and front and back surfaces of said plate glass are finished with a maximum surface ruggedness not exceeding 0.007 mm.

2. Heat-reinforced plate glass as defined in claim 1, wherein said heat reinforcing treatment provides a surface compression stress of 17 to 25 kgf/mm$^2$.

3. Heat-reinforced plate glass as defined in claim 1, wherein said end surfaces have received grinding treatment in longitudinal directions thereof.

4. Heat-reinforced plate glass having received heat reinforcing treatment over the entire surfaces thereof;
   wherein the end surfaces of said plate glass are formed flat and said heat-reinforced plate glass has a surface compression stress of 17 to 25 kgf/mm$^2$ applied substantially uniformly to the entire surfaces thereof; and
   end surfaces of said plate glass are formed by a grinding treatment applied along longitudinal directions thereof, wherein boundaries between said end surfaces and front and back surfaces of said plate glass are formed by grinding treatment.

5. Heat-reinforced plate glass as defined in claim 4, wherein said end surfaces of said plate glass are finished with a maximum surface ruggedness not exceeding 0.05 mm, and said boundaries between said end surfaces and front and back surfaces of said plate glass are finished with a maximum surface ruggedness not exceeding 0.007 mm.

6. Heat-reinforced plate glass as defined in claim 1, wherein a dark colored layer is formed in edge regions on at least one of said surfaces.

7. Heat-reinforced plate glass as defined in claim 1, wherein said plate glass is double glazing.

8. Heat-reinforced plate glass as defined in claim 2, wherein said end surfaces have received grinding treatment in longitudinal directions thereof.

9. Heat-reinforced plate glass as defined in claim 2, wherein a dark colored layer is formed in edge regions on at least one of said surfaces.

10. Heat-reinforced plate glass as defined in claim 3, wherein a dark colored layer is formed in edge regions on at least one of said surfaces.

11. Heat-reinforced plate glass as defined in claim 4, wherein a dark colored layer is formed in edge regions on at least one of said surfaces.

12. Heat-reinforced plate glass as defined in claim 5, wherein a dark colored layer is formed in edge regions on at least one of said surfaces.

13. Heat-reinforced plate glass as defined in claim 2, wherein said plate glass is double glazing.

14. Heat-reinforced plate glass as defined in claim 3, wherein said plate glass is double glazing.

15. Heat-reinforced plate glass as defined in claim 4, wherein said plate glass is double glazing.

16. Heat-reinforced plate glass as defined in claim 5, wherein said plate glass is double glazing.

17. Heat-reinforced plate glass as defined in claim 6, wherein said plate glass is double glazing.

18. A method of finishing edge regions of heat-reinforced plate glass having received heat reinforcing treatment over entire surfaces thereof, said heat-reinforced plate glass edge finishing method being characterized in that a grinding step is executed to form end surfaces of said plate glass flat with a maximum surface ruggedness not exceeding 0.05 mm, and then a finishing step is executed to finish boundaries between said end surfaces and front and back surfaces of said plate glass with a maximum surface ruggedness not exceeding 0.007 mm.

19. A heat-reinforced plate glass edge finishing method as defined in claim 18, wherein said heat reinforcing treatment provides a surface compression stress of 17 to 25 kgf/mm$^2$.

20. A heat-reinforced plate glass edge finishing method as defined in claim 19 wherein said finishing step is based on one of buff grinding, partial heat melting and chemical dissolution.

21. A method of manufacturing heat-reinforced plate glass, wherein a grinding step is executed to form end surfaces of said plate glass flat with a maximum surface ruggedness not exceeding 0.05 mm, then a finishing step is executed to finish boundaries between said end surfaces and front and back surfaces of said plate glass with a maximum surface ruggedness not exceeding 0.007 mm; and then a heat-reinforcing step is executed with a heating temperature not exceeding the glass softening point.

22. A method of manufacturing heat-reinforced plate glass as defined in claim 21, wherein said heat reinforcing step adopts a cooling air applying back pressure of 500 mm Aq.

* * * * *